(12) United States Patent
Frank et al.

(10) Patent No.: US 7,745,534 B2
(45) Date of Patent: Jun. 29, 2010

(54) PROCESS FOR THE PRODUCTION OF CERAMIC GREEN FILMS WITH ACETALIZED POLYVINYL ALCOHOLS

(75) Inventors: Michael Frank, Mainz (DE); Robert Fuss, Liederbach (DE)

(73) Assignee: Kuraray Europe GmbH, Frankfurt (DE)

( * ) Notice: Subject to any disclaimer, the term of this patent is extended or adjusted under 35 U.S.C. 154(b) by 380 days.

(21) Appl. No.: 11/745,725

(22) Filed: May 8, 2007

(65) Prior Publication Data

US 2007/0262496 A1 Nov. 15, 2007

(30) Foreign Application Priority Data

May 10, 2006 (EP) .................................. 06113753
Apr. 12, 2007 (EP) .................................. 07106006

(51) Int. Cl.
*C08F 8/00* (2006.01)

(52) U.S. Cl. .............................. 525/61; 525/56; 525/58; 524/503; 524/557

(58) Field of Classification Search .................... 525/56, 525/58, 61; 524/503, 557
See application file for complete search history.

(56) References Cited

U.S. PATENT DOCUMENTS 6,211,289 B1 * 4/2001 Tschirner et al. .............. 525/61

FOREIGN PATENT DOCUMENTS

| DE | 40 03 198 | | 8/1991 |
|---|---|---|---|
| DE | 40 03 198 A1 | * | 8/1991 |
| DE | 198 16 722 | | 10/1999 |

OTHER PUBLICATIONS

European International Search Report issued Aug. 25, 2006 in EP 06 11 3753.

* cited by examiner

*Primary Examiner*—Ling-Siu Choi
(74) *Attorney, Agent, or Firm*—Millen, White, Zelano, Branigan, P.C.

(57) ABSTRACT

Acetalized polyvinyl alcohols having a high residual polyvinyl acetate content are suitable as use as dispersing agents in the production of ceramic green films.

27 Claims, 5 Drawing Sheets

Fig. 3
Ordinate: Suspension viscosity (Pas)
Bsp. = Example
Fischöl = fish oil
Fig. 4
Ordinate: Viscosity (Pas)

PROCESS FOR THE PRODUCTION OF CERAMIC GREEN FILMS WITH ACETALIZED POLYVINYL ALCOHOLS

The present invention relates to the use of acetalized polyvinyl alcohols for the production of ceramic green films and/or to a process for the production of these ceramic green films.

Ceramic materials for the electronics industry are frequently produced by sintering of a so-called green film, i.e. a film-like, thin moulded body which contains the ceramic materials. For the production of these green films, a suspension of metal oxides and organic solvents is first produced using plasticisers and dispersing agents. This suspension is subsequently applied by means of a suitable process (i.e. doctor blade process) in the desired thickness onto a carrier film and the solvent is removed. The green film thus obtained must be free from cracks, exhibit a smooth surface and still have a certain elasticity.

Fish oils, polyacrylates or certain polyvinyl acetals such as polyvinyl butyral are frequently used as binders and/or dispersing agents for the production of ceramic green films. Thus DE 4 003 198 A1 describes the production of a casting slip for ceramic green films in which polyvinyl butyral with a residual polyvinyl acetate content of 0 to 2% by weight is used as binder. In an analogous manner, DE 3 724 108 A1 discloses the use of polyvinyl butyral, the residual vinyl acetate content being 0.5 to 3.0% by weight.

However, the polyvinyl butyrals described here exhibit a low dispersability and serve as temporary binder to guarantee the flexibility of the desired green film. Suspensions obtained in this way exhibit only a relatively low proportion of solids.

From a different technical field, namely the production of printing inks and paints, the use of polyvinyl butyral with a higher residual acetate content is known (DE 198 16 722 A1). Moreover, DE 1545135 A1 discloses the use of polyvinyl butyral with a residual acetate content of 8% for the production of dispersions.

The above-mentioned documents relate to the process of dispersing organic pigments and/or to dispersions as such and not to the manufacture of suspensions of ceramic powders or ceramic green films.

In U.S. Pat. No. 6,211,289, the use of an acetalized copolymer of vinyl alcohol and 1-alkyl vinyl alcohols in suspensions is described for the production of green films. These compounds exhibit a residual acetate content of <5% by weight, presumably for adjusting a suitable viscosity of the suspension. Moreover, the production of the copolymer from vinyl alcohol and 1-alkyl vinyl alcohols is complicated.

SUMMARY OF THE INVENTION

According to one aspect of the present invention, there are provided binders and/or dispersing agents for the production of suspensions for ceramic green films which exhibit a high dispersion effect and guarantee a high solids content with a simultaneously low viscosity of the suspension.

Surprisingly enough, it has been found that polyvinyl acetals with a high residual polyvinyl acetate content are highly suitable as binders or dispersing agents for the production of ceramic suspensions and consequently for the production of ceramic green films.

Another aspect of the present invention involves the use of acetalized polyvinyl alcohols for the production of ceramic green films or ceramic moulded bodies, the acetalized polyvinyl alcohol exhibiting a polyvinyl acetate content of 8 to 50% by weight and a degree of polymerization $\overline{P}_w$ of 100 to 1200.

Upon further study of the specification and appended claims, further objects, aspects and advantages of this invention will become apparent to those skilled in the art.

The acetalized polyvinyl alcohols used according to the invention contain vinyl alcohol units without 1-alkyl vinyl alcohol units. Preferably, they exhibit a polyvinyl acetate content of 10 to 50% by weight, particularly preferably 10 to 30% by weight, in particular 10 to 20% by weight or 14 to 18% by weight.

Moreover, the acetalized polyvinyl alcohols may exhibit a polyvinyl alcohol content of 10 to 35% by weight, preferably 11 to 27% by weight, and in particular 16 to 21% by weight.

The degree of polymerization $\overline{P}_w$ of the acetalized polyvinyl alcohols is preferably 100-1000, particularly preferably 100-800, and in particular 100-500.

Preferably, the acetalized polyvinyl alcohols used exhibit a viscosity determined according to DIN 53015 (10% solution in ethanol at 20° C. in the Hoeppler viscosimeter) of 2 to 500 mPas, particularly preferably of 2 to 200 mPas, in particular 2 to 125 mPas or 2 to 75 mPas.

The acetalized polyvinyl alcohols used according to the invention can be used in the completely or partially acetalized state, the use of partially acetalized polyvinyl alcohols with a degree of acetalation of 15 to 80% by weight, in particular 20 to 60% by weight being preferred. The degree of acetalation of the acetalized polyvinyl alcohols used according to the invention is also determined from the difference of 100% compared with the polyvinyl acetate content plus the polyvinyl alcohol content (in % by weight in each case).

For the acetalation of the polyvinyl alcohols, one or several aldehydes from the group of formaldehyde, acetaldehyde, propanal, butanal, isobutanal, pentanal, hexanal, heptanal, octanal, nonanal, isononanal or decanal can be used. Preferably, butanal is used for the acetalation such that polyvinyl butyral is in turn preferably used for the production of the green film.

In principle, the expert is familiar with the production of the acetalized polyvinyl alcohol and it is carried out by the acid-catalysed acetalation of a corresponding polyvinyl alcohol. The polyvinyl butyrals and/or their production process disclosed in DE 19 816 722 A1, the disclosure of which is incorporated by reference, are particularly suitable. For the production of the polyvinyl acetals and/or polyvinyl butyrals suitable for use according to the invention, reference is specifically made to this document.

According to another aspect of the invention, a process is provided for the production of ceramic green films or ceramic moulded bodies by casting and drying a suspension containing one or more inorganic pigments, one or more organic solvents, one or more binders, one or more plasticisers, and one or more dispersing agents, wherein an acetalized polyvinyl alcohol with a polyvinyl acetate content of 8 to 50% by weight or the other above-mentioned polyvinyl acetate contents and a degree of polymerization $\overline{P}_w$ of 100 to 1200 being used as a dispersing agent.

According to another aspect of the invention, a suspension composition is provided comprising one or more inorganic pigments, one or more organic solvents, one or more binders, one or more plasticisers, and one or more dispersing agents, wherein an acetalized polyvinyl alcohol with a polyvinyl acetate content of 8 to 50% by weight or the other above-mentioned polyvinyl acetate contents and a degree of polymerization $\overline{P}_w$ of 100 to 1200 being used as a dispersing agent.

Preferably, the suspensions produced according to the invention contain 0.1 to 10% by weight, especially 1 to 8% by weight, particularly 2 to 6% by weight, and very particularly 0.1 to 2% by weight of the so-called acetalized polyvinyl alcohol.

Preferably, the amount of pigments(s) in the suspension is 40-80% by weight, especially 50-70% by weight. The amount of solvent(s) in the suspension is preferably 15-35% by weight, especially 20-25% by weight. The amount of plasticizer(s) in the suspension is preferably 1-10% by weight, especially 2-8% by weight. The amount of dispersion agent(s) in the suspension is preferably 0.5-5% by weight, especially 1-2% by weight. The amount of binder(s) in the suspension is preferably 0.1-10% by weight, especially 1-8% by weight.

Regarding the production of ceramic green bodies, reference should be made to the above-mentioned documents. As a rule, one or several organic pigments such as, e.g., $Al_2O_3$, $BaTiO_3$, W oxides, $ZrO_2$, $TiO_2$ or aluminium nitrite is/are first suspended with an organic solvent such as, e.g., methanol, toluene, MEK (methyl ethyl ketone), paraffins or isopropanol or mixtures of these. Into this suspension, a dispersant such as fish oil and/or the above-mentioned acetalized polyvinyl alcohols is/are added. Subsequently, one or several plasticisers is/are added to the suspension and homogenised in the course of several hours.

Preferably, phthalates such as dioctyl phthalate, dibutyl phthalate or benzyl butyl phthalate, adipates, polyethylene glycols, phosphoric acid esters, citric acid esters or esterified polyethylene glycols such as 3G7 or 3G8 are used as plasticisers.

For the production of the suspensions, the process according to the invention may thus comprise the following steps:
  suspending an inorganic material (pigment) in an organic solvent
  addition of a dispersing agent
  optionally: foaming the inorganic material in a mixture of solvent and dispersing agent
  homogenising of the suspension
  addition of a plasticiser
  addition of a binder which, optionally, is identical to the dispersing agent
  homogenising of the suspension The use, process, or composition according to the invention make it possible to largely or completely replace the materials usually used as dispersant by the so-called acetalized polyvinyl alcohols. Preferably, a dispersant mixture is used which contains in a proportion of at least 50% by weight, in particular at least 75% and especially 100% of the above-mentioned acetalized polyvinyl alcohol.

The polymeric binders incorporated into the suspension are, e.g., of standard polyvinyl butyrals, polyacrylates and/or the above-mentioned acetalized polyvinyl alcohols, as such or in mixture. Suitable as standard polyvinyl butyral are, e.g., the types Mowital B20H, B45H, B45M, B60, B60H or B75 from Kuraray Europe GmbH. The polyvinyl acetate content of these standard polyvinyl butyrals is 1 to 4% by weight.

It is possible, in particular, to use a mixture of one or several standard polyvinyl butyrals and of one or several of the above-mentioned acetalized polyvinyl alcohols, the proportion of standard polyvinyl butyrals being less than 50% by weight (i.e., 0 to less than 50% by weight, for example, greater than 0 to less than 50% by weight), preferably less than 25% by weight (i.e., between 0 and less 25% by weight, for example, greater than 0 to less than 25% by weight) and in particular 0 and 10% by weight (for example, greater than 0 to 10% by weight).

Preferably, the total amount of the above-mentioned acetalized polyvinyl alcohols in the suspensions produced according to the invention is 0.1 to 10% by weight, especially 1 to 8% by weight, particularly 2 to 6% by weight, and very particularly 0.1 to 2% by weight.

In a variant of the present invention, only the above-mentioned acetalized polyvinyl alcohols are used as binders and no other polymeric binders.

In a further variant of the present invention, only the above-mentioned acetalized polyvinyl alcohols are used as dispersant and as binder and no further polymeric binders or dispersants.

The suspension thus obtained is homogenised in suitable mixers such as, e.g., ball mills. Suspensions which have been produced by using the acetalized polyvinyl alcohols are characterised by a particularly low viscosity with an equally low concentration of dispersant. Correspondingly, the suspensions may have high proportions of solids with a low viscosity which greatly facilitates processing of the suspension to ceramic green films in continuous production facilities.

BRIEF DESCRIPTION OF THEE DRAWINGS

Various other features and attendant advantages of the present invention will be more fully appreciated as the same becomes better understood when considered in conjunction with the accompanying drawings, wherein.

EXAMPLES

Methods of Determination a) Determination of the Polyvinyl Acetate Content

The polyvinyl acetate content should be understood to mean the proportion, in % by weight, of acetyl groups which results from the consumption of the potassium hydroxide solution necessary for the saponification of 1 g of substance.

Method of Determination (On the Basis of EN ISO 3681): Approximately 2 g of the substance to be investigated are weighed accurately to 1 mg into a 500 ml round bottomed flask and dissolved in 90 ml of ethanol and 10 ml of benzyl alcohol under reflux. After cooling, the solution is neutralized with 0.01 N NaOH against phenol phthalaene. Subsequently, 25.0 ml of 0.1 N KOH are added and heating under reflux is carried out for 1.5 hours. The flask is allowed to cool in the closed state and the excess liquor is titrated with 0.1 N hydrochloric acid against phenolphthalein as indicator until a permanent decolouration is obtained. A blank is treated in the same way. The PV acetate content is calculated as follows: PV acetate content in [%]=(b−a)*86/E, with a=consumption of 0.1 N KOH for the sample in ml, b=consumption of 0.1 N KOH for the blank test in ml and E=amount of the substance to be examined weighed in in the dry state in g.

b) Determination of the Content of Polyvinyl Alcohol Groups

The content of polyvinyl alcohol groups (polyvinyl alcohol content) is the proportion of hydroxyl groups which is detectable by the subsequent acetalation with acetic anhydride.

Method of Determination (On the Basis of DIN 53240): Approximately 1 g of Mowital is weighed accurately to 1 mg into a 300 ml ground Erlenmeyer flask, 10.0 ml of acetic anhydride pyridine mixture (23:7 v/v) are added and this is heated for 15-20 hours to 50° C. After cooling, 17 ml of 1,2-dichloroethane are added and rotated briefly. Subsequently, 8 ml of water are added with stirring, the flask is closed with a stopper and stirring is carried out for 10 minutes. The neck of the flask and the stopper are rinsed with 50 ml of demineralised water, covered with 5 ml of n-butanol and the free acetic acid is titrated with 1 N caustic soda solution against phenolphthalein. A blank specimen is treated in the same way. The polyvinyl alcohol content is calculated as follows: polyvinyl alcohol content [%]=(b−a)*440/E with a=consumption of 1 N NaOH for the sample in ml, b=consumption of 1 N NaOH for the blank sample in ml and E=amount of the substance to be examined weighed in in the dry state in g.

c) Determination of the Viscosity

The viscosity of the polyvinyl acetals used is determined according to DIN 53015 on a 10% solution in ethanol at 20° C. in the Hoeppler viscosimeter.

d) Determination of the Degree of Polymerization

The degree of polymerization $\overline{P}_w$ can be determined more easily on polyvinyl alcohols and does not change during acetalization. Using polyvinyl butyral as an example, the degree of polymerization $\overline{P}_w$ is calculated according to the following formula:

$$\overline{P}_w = \frac{\overline{M}_w}{(86 - 0.42 \cdot DH)}$$

$\overline{M}_w$ is carried out by gel permeation chromatography (GPC) on re-acetalized samples combined with static light scattering (absolute method). The accuracy of the values for $\overline{M}_w$ was determined as being ±15%.

The degree of hydrolysis (DH [mole %]) is calculated according to the following formula:

$$DH = \frac{100 - 0.1535 \cdot EV}{100 - 0.0749 \cdot EV} \cdot 100$$

The ester value (EV) is determined as follows and using the following formula:

$$EV = \frac{(a - b) \cdot 5.61}{E}$$

With a=consumption of 0.1 N KOH [ml], b=consumption of 0.1 N KOH [ml] for the blank samples, E=accurate amount of polyvinyl alcohol weight in.

Approximately 1 g of the polyvinyl alcohol is introduced into a 250 ml round bottomed flask and 70 ml of distilled water and 30 ml of neutralized alcohol are added and heated under reflux until the polyvinyl alcohol has dissolved completely. After cooling, titration is carried out with 0.1 N KOH against phenolphthalein up to neutrality. When neutralization has been completed, 50 ml of 0.1 N KOH are added and this mixture is heated under reflux for one hour. The excess of the liquor is back-titrated with 0.1 N HCl in the heat against phenolphthalein as indicator until the colour of the solution no longer returns. Simultaneously, the test is carried out with a blank sample.

Comparative Examples

Binder According to the State of the Art, all from Kuraray Europe GmbH

1) Mowital B45H with a degree of polymerization of approximately 600

2) Mowital B60H with a degree of polymerization of approximately 800

3) Mowital B20H with a degree of polymerization of approximately 400

Example 1

Binder Used

Polyvinyl butyral according to DE 19 816 722 A1 with a degree of polymerization of approximately 800, with a polyvinyl alcohol content of 20.2% by weight, a polyvinyl acetate content of 16.1% and a viscosity determined in the Hoeppler viscosimeter of a 10% solution in ethanol at 20° C. according to DIN 53015 of 122.5 mPas.

Example 2

Binder Used

Polyvinyl butyral according to DE 19 816 722 A1 with a degree of polymerization of approximately 1100, with a polyvinyl alcohol content of 20.7% by weight, a polyvinyl acetate content of 16.2% and a viscosity determined in the Hoeppler viscosimeter of a 10% solution in ethanol at 20° C. according to DIN 53015 of 275 mPas.

Example 3

Binder Used

Polyvinyl butyral according to DE 19 816 722 A1 with a degree of polymerization of approximately 350, with a polyvinyl alcohol content of 19.6% by weight, a polyvinyl acetate content of 19.4% and a viscosity determined in the Hoeppler viscosimeter of a 10% solution in ethanol at 20° C. according to DIN 53015 of 20.8 mPas.

Further Materials Used

| Component | Description |
| --- | --- |
| Solvent | azeotropic toluene-ethanol mixture |
| Dispersant | Menhaden fish oil, Reichold Inc., USA |
| Ceramic filler | alumina A16-SG, Alcoa, USA |
| | grain size $d_{50}$: 0.35 µm |
| | specific surface area (BET): 6.6 m$^2$/g |
| Plasticiser | alkyl (C7-C9) benzyl phthalate, Ferro |

Evaluation of the Suspension Properties a) Rheological Behavior of the Binder Solutions Measuring process: For the determination of the rheological properties, solutions of 10 mass % of the PVBs respectively in the solvent mixture of ethanol/toluene were produced and homogenised for 24 hours in the tumble mixer.

The rheological characterization takes place according to the cone and plate principle of measurement (cone diameter 50 mm, aperture angle 2°) using the rotation rheometer UDS 200 from Anton Paar (Austria). The control of the rotating cone takes place by shear stress control, the measuring temperature was 20° C. The viscosity was plotted against the shear stress.

Figure 1:
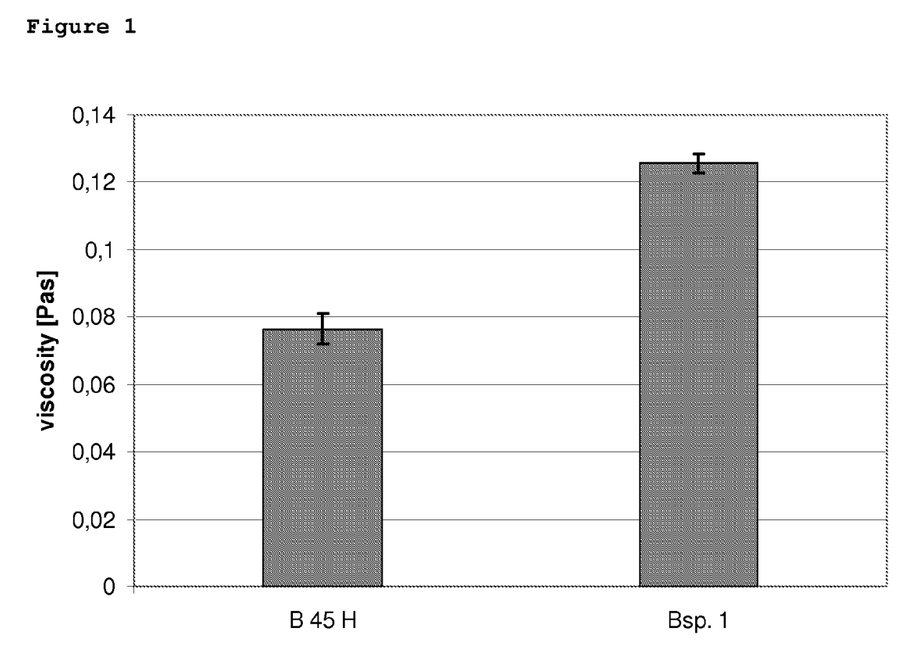
FIG. 1 shows the average viscosity of the binder solutions of Example 1 and Comparative Example 1 with a shear stress of 20 Pa*s.
Figure 2:
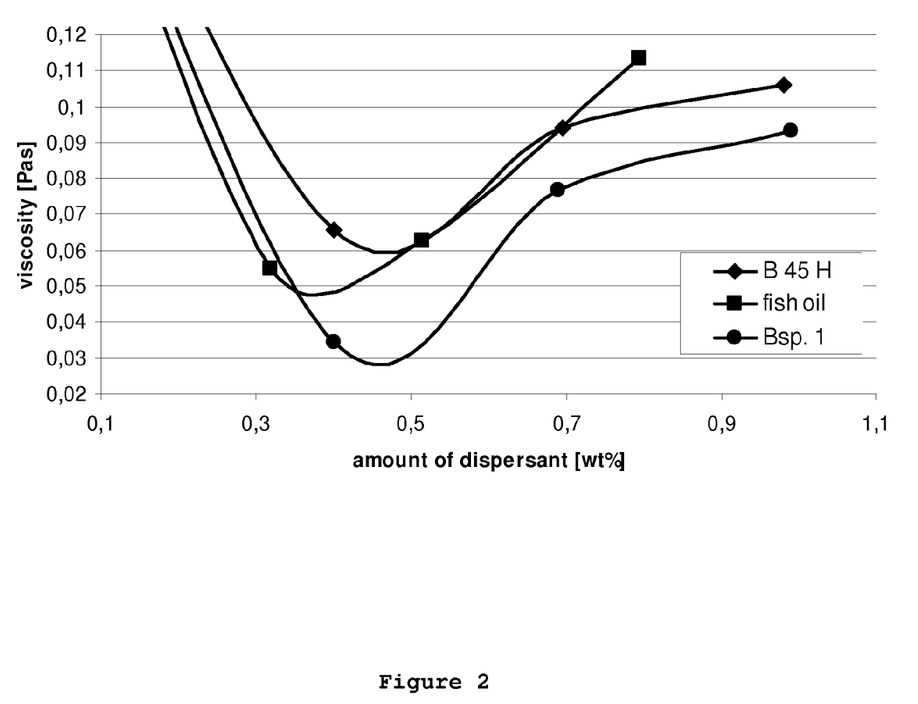
FIG. 2 show the viscosities of different suspensions as a function of the solids content of the suspension.
Figure 4:
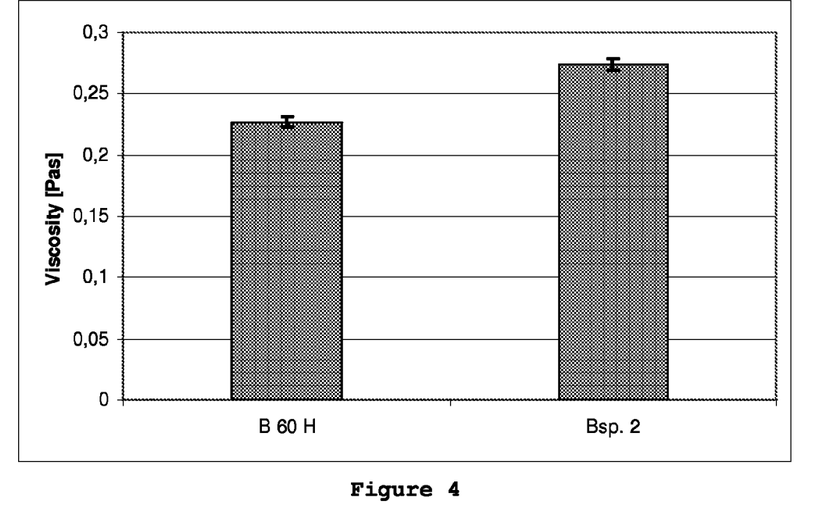
FIG. 4 shows the average viscosity of the binder solutions of Example 2 and Comparative Example 2 with a shear stress of 20 Pa*s.
Figure 6:
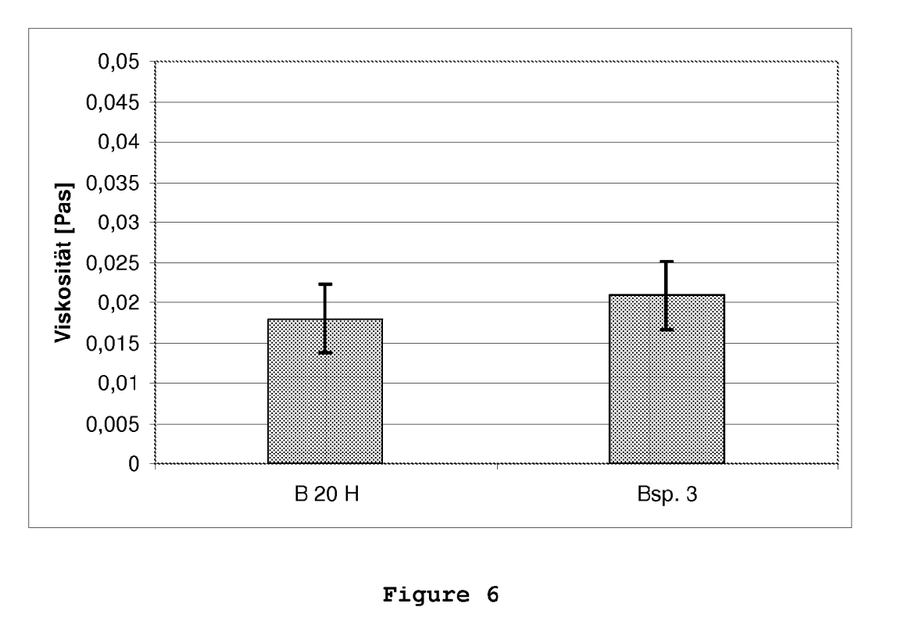
FIG. 6 shows the average viscosity of the binder solutions of Example 3 and Comparative Example 3 with a shear stress of 20 Pa*s.

Results and evaluation: FIGS. 1, 4 and 6 show the average viscosity of the binder solutions concerned with a shear stress of 20 Pa*s, the binder solutions exhibiting a constant viscosity over the entire measuring range (Newtonian behavior). The following table shows the measured data relating to the above figures.

|  | VB 1 B45H | Example 1 | VB 2 B60H | Example 2 | VB 3 B20H | Example 3 |
|---|---|---|---|---|---|---|
| Viscosity [mPa * s] | 70-80 | 125 | 227 | 274 | 18 | 21 |

The solutions with the PVB according to the invention with high polyvinyl acetate contents according to example 1, 2 and 3 show a higher solution viscosity than the comparative substances B20H, B45H and B60H.

b) Rheology of PVB-$Al_2O_3$ Suspensions

Method of measurement: In order to assess the dispersing effect of the PVB binders, different $Al_2O_3$ suspensions (40% by weight of ethanol/toluene, 60% by weight of $Al_2O_3$) were prepared. To these, the PVB binder and/or dispersant concerned was added stepwise and homogenised for several hours. For the production of the films, the dispersant (in this case the PVB) was first pre-dissolved in the solvent and then the powder was added. The suspension concerned was characterised by means of a rotation viscosimeter. For this purpose, the suspension viscosity at a rate of shear of 100 l/s was used as comparative value.

Results and evaluation: FIGS. 2, 3, 5 and 7 show the viscosities of different suspensions as a function of the solids content of the suspension. The PVB binders used have a reduced viscosity in comparison with the fish oil frequently used as dispersant. Moreover, a better dispersing effect is obtained in comparison with the comparative substances Mowital B20H, B45H and B60H since the viscosity values of suspensions prepared correspondingly are below those of the suspensions prepared with the Mowital types.

Figure 3:
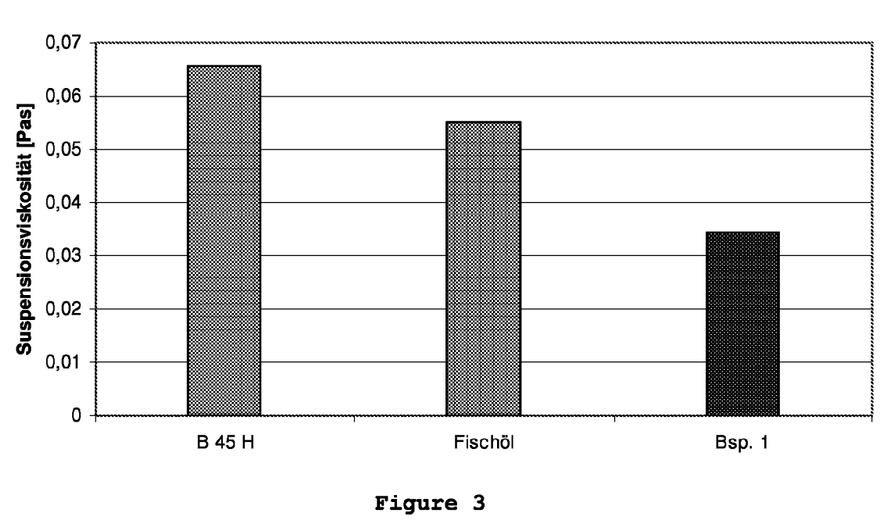
FIG. 3 shows a comparison of the dispersing properties of the dispersant of Example 1, B45H, and fish oil.
Figure 5:
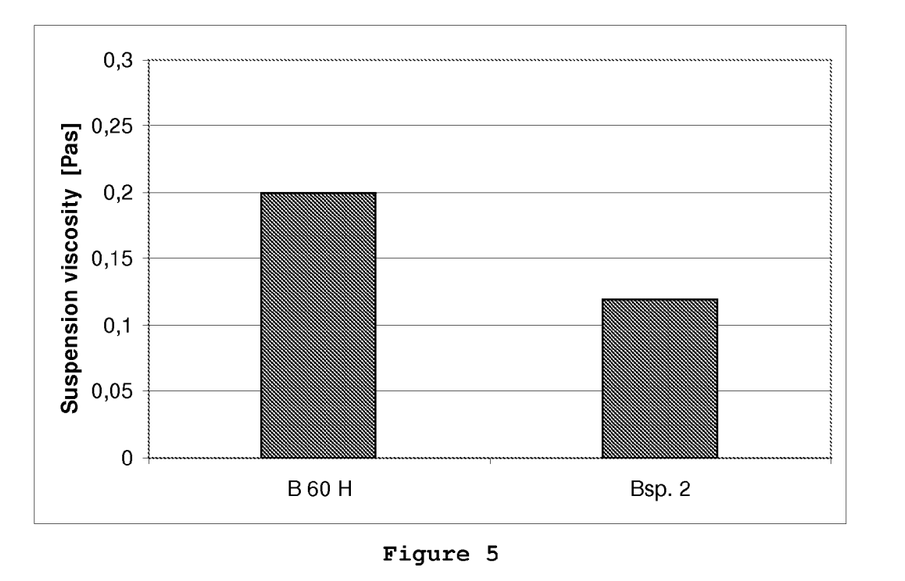
FIG. 5 shows a comparison of the dispersing properties of the dispersant of Example 2 and B60H.
Figure 7:
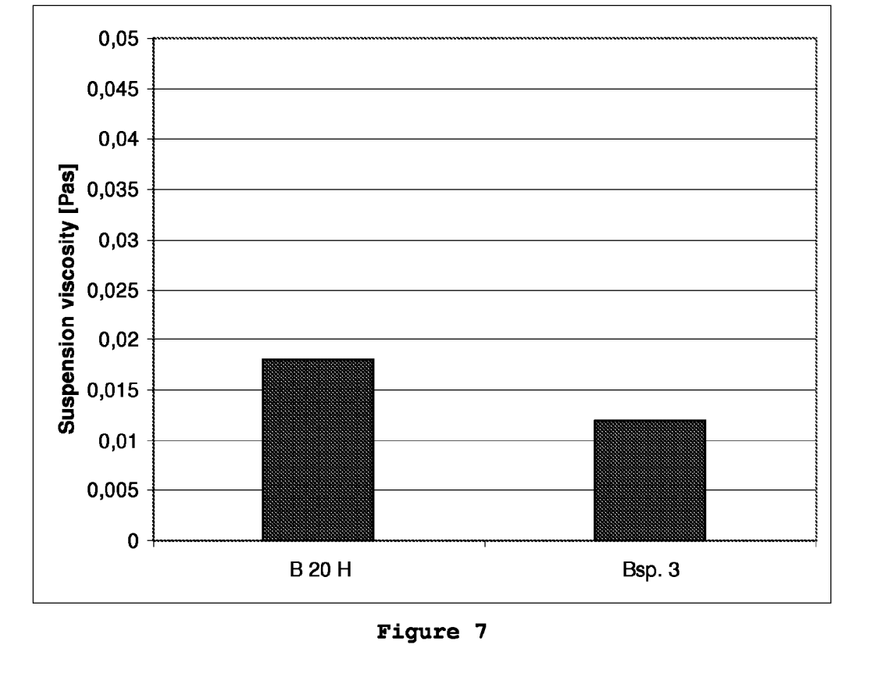
FIG. 7 shows a comparison of the dispersing properties of the dispersant of Example 3 and B20H.

A comparison of the dispersing properties of the dispersants investigated is shown in FIGS. 3, 5 and 7. The better the dispersion effect, the lower is the viscosity of the $Al_2O_3$ suspension concerned. A clearly more liquid and consequently better dispersed suspension is achieved when using the PVB type with a high polyvinyl acetate content instead of B45H or fish oil.

Production of Green Films

The suspensions (casting slip) thus obtained were degassed and cast in a film casting facility of 4 m length with a fixed double chamber casting implement according to the doctor blade process. A siliconised PET film (thickness 100 μm) was used as casting support. After casting, the film was dried in the air for 48 h (temperature=22° C.; atmospheric humidity=65%) and subsequently drawn off.

The films obtained had a thickness of 200 μm and exhibited no cracks, blisters or faults during optical assessment.

The density of the cast $Al_2O_3$ films was determined by buoyancy measurement according to Archimedes. The green film densities were all within the range which was standard for film casting of between 60 and 70% of the theoretical thickness.

From the green films concerned, suitable tensile specimens in the form of so-called "dog bones" were punched out. 10 tensile specimens per type of film were punched out across and 10 specimens parallel to the direction of casting in order to be able to determine a possible anisotropic behavior of the green body. A fiber tensile test facility (Fafegraph ME, Textecho) was used as test machine. The maximum area of measurement was 100 N, the rate of loading 10 mm/min. The measurements were carried out at room temperature in ambient air.

Values comparable to green films according to the state of the art were determined which indicate no significant differences in characteristics between the films produced according to the invention and those according to the state of art.

Consequently, the new PVB type is suitable as dispersant and simultaneous binder for the production of ceramic green films. Advantageously, an improved dispersion effect and a higher solids content is achieved during the production of the suspension and consequently considerable application technological advantages are achieved.

The entire disclosures of all applications, patents and publications, cited herein and of corresponding European Application No. 06113753, filed May 10, 2006 and European Application No. 07106006, filed Apr. 12, 2007, are incorporated by reference herein.

The preceding examples can be repeated with similar success by substituting the generically or specifically described reactants and/or operating conditions of this invention for those used in the preceding examples.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

We claim:

1. A process for the production of ceramic green films or ceramic moulded bodies, said process comprising casting and drying a suspension comprising one or more inorganic pigments, one or more organic solvents, one or more binders, one or more plasticizers, and one or more dispersing agents, wherein an acetalized polyvinyl alcohol with a vinyl acetate content of 8 to 50% by weight and a degree of polymerization $\overline{P}_w$ of 100 to 1200 is used as said dispersing agent, wherein said acetalized polyvinyl alcohol does not contain 1-alkyl vinyl alcohol units.

2. A process according to claim 1, wherein said suspension contains 0.1 to 10% by weight of said acetalized polyvinyl alcohol.

3. A process according to claim 1, wherein said acetalized polyvinyl alcohol has a vinyl alcohol content of 10 to 35% by weight.

4. A process according to claim 1, wherein said acetalized polyvinyl alcohol has a degree of polymerization of 100 to 1000.

5. A process according to claim 1, wherein said acetalized polyvinyl alcohol has a viscosity, determined according to DIN 53015, of 2 to 500 mPas.

6. A process according to claim 1, wherein one or several aldehydes selected from formaldehyde, acetaldehyde, propanal, butanal, isobutanal, pentanal, hexanal, heptanal, octanal, nonanal, isononanal, and decanal are used for the acetalation of said polyvinyl alcohol.

7. A process according to claim 1, wherein polyvinyl butyral is used as said acetalized polyvinyl alcohol.

8. A process according to claim 1, wherein said acetalized polyvinyl alcohol has a vinyl acetate content of 10 to 50% by weight.

9. A process according to claim 1, wherein said acetalized polyvinyl alcohol has a vinyl acetate content of 10 to 30% by weight.

10. A process according to claim 1, wherein said acetalized polyvinyl alcohol has vinyl alcohol content of 10 to 35% by weight.

11. A process according to claim 1, wherein said acetalized polyvinyl alcohol has a vinyl alcohol content of 11 to 27% by weight.

12. A process according to claim 1, wherein said acetalized polyvinyl alcohol has a degree of polymerization $\overline{P}_w$ of 100-1000.

13. A process according to claim 1, wherein said acetalized polyvinyl alcohols has a viscosity of 2 to 200 mPas determined in a 10% solution in ethanol at 20° C.

14. A process according to claim 1, wherein said acetalized polyvinyl alcohol has a vinyl acetate content of 10 to 50% by weight, and a vinyl alcohol content of 10 to 35% by weight.

15. A process according to claim 1, wherein said acetalized polyvinyl alcohol has a degree of acetalation of 20 to 60% by weight.

16. In a process for production of ceramic green films or ceramic moulded bodies, said process comprising casting and drying a suspension, the improvement wherein said suspension contains, as a dispersing agent, an acetalized polyvinyl alcohol having a vinyl acetate content of 8 to 50% by weight and a degree of polymerization of 100 to 1200, wherein said acetalized polyvinyl alcohol does not contain 1-alkyl vinyl alcohol units.

17. A suspension composition comprising one or more inorganic pigments, one or more organic solvents, one or more binders, one or more plasticizers, and one or more dispersing agents, wherein an acetalized polyvinyl alcohol with a vinyl acetate content of 8 to 50% by weight and a degree of polymerization $\overline{P}_w$ of 100 to 1200 is used as said dispersing agent, wherein said acetalized polyvinyl alcohol does not contain 1-alkyl vinyl alcohol units.

18. A suspension according to claim 17, wherein said suspension contains 0.1 to 10% by weight of said acetalized polyvinyl alcohol.

19. A suspension according to claim 18, wherein said suspension contains 1 to 8% by weight of said acetalized polyvinyl alcohol.

20. A suspension according to claim 17, wherein said one or more pigments are selected from $Al_2O_3$, $BaTiO_3$, W oxides, $ZrO_2$, $TiO_2$ or aluminum nitrite, said one or more solvents are selected from methanol, toluene, methyl ethyl ketone, paraffins, and isopropanol, and said one or more plasticizers are selected from phthalates, adipates, polyethylene glycols, phosphoric acid esters, citric acid esters or esterified polyethylene glycols.

21. A suspension according to claim 17, wherein the binder and dispersing agent are the same material.

22. A suspension according to claim 17, wherein said suspension contains a mixture of dispersants and said mixture of dispersants contains at least 50% by weight of said acetalized polyvinyl alcohol.

23. A suspension according to claim 17, wherein said one or more binders are selected from polyvinyl butyrals, polyacrylates and said acetalized polyvinyl alcohols.

24. A suspension according to claim 17, wherein said suspension contains a mixture of binders containing one or more polyvinyl butyrals and one or more of said acetalized polyvinyl alcohols, wherein the proportion of polyvinyl butyrals is less than 50% by weight.

25. A suspension according to claim 17, wherein the amount of pigments(s) in the suspension is 40-80% by weight, the amount of solvent(s) in the suspension is 15-35% by weight, the amount of plasticizer(s) in the suspension is 1-10% by weight, the amount of dispersion agent(s) in the suspension is 0.5-5% by weight, and the amount of binder(s) in the suspension is 0.1-10% by weight.

26. A suspension according to claim 17, wherein said acetalized polyvinyl alcohol has a vinyl acetate content of 10 to 50% by weight, and a vinyl alcohol content of 10 to 35% by weight.

27. A suspension according to claim 17, wherein said acetalized polyvinyl alcohol has a degree of acetalation of 20 to 60% by weight.

* * * * *